United States Patent [19]

Sekella

[11] 4,285,420
[45] Aug. 25, 1981

[54] AIR GAP ADJUSTER FOR ELECTRIC CLUTCHES

[75] Inventor: Thomas C. Sekella, Elmira, N.Y.

[73] Assignee: Facet Enterprises, Inc., Tulsa, Okla.

[21] Appl. No.: 59,931

[22] Filed: Jul. 23, 1979

[51] Int. Cl.³ .................. F16D 13/75; F16D 27/10
[52] U.S. Cl. ............................. 192/84 C; 192/90; 192/110 R; 192/111 A
[58] Field of Search ............ 192/90, 111 A, 111 B, 192/84 C, 110 R; 188/171, 196 D, 196 V, 71.8, 71.9

[56] References Cited

U.S. PATENT DOCUMENTS

| 3,086,631 | 4/1963 | Imperi | 192/111 B X |
| 3,288,257 | 11/1966 | Ulbing | 192/111 A X |
| 3,391,768 | 7/1968 | Fixari | 192/111 A |
| 3,458,022 | 7/1969 | Reiff | 192/111 A X |
| 3,485,330 | 12/1969 | Reiff | 192/111 A X |
| 3,613,849 | 10/1971 | Pape | 192/111 A X |
| 3,762,522 | 10/1973 | Kirschling | 192/111 A |
| 3,857,468 | 12/1974 | Iritono et al. | 192/111 A X |
| 4,030,583 | 6/1977 | Miller | 192/90 X |
| 4,142,610 | 3/1979 | Alexander et al. | 192/90 X |
| 4,175,650 | 11/1979 | Miller | 192/111 A X |

FOREIGN PATENT DOCUMENTS 43-11004  6/1968  Japan ..................... 192/111 A Primary Examiner—Rodney H. Bonck
Attorney, Agent, or Firm—Remy J. VanOphem

[57] ABSTRACT

An electromagnetic clutch device for torque transmission from an input means to an output means which incorporates an air gap adjustment feature between the pole faces and the armature during assembly of the clutch. The air gap adjuster permits the armature to be responsive to magnetic flux formed by a predetermined electromagnetic coil voltage without having to tear down the assembly if the predetermined coil voltage is exceeded at initial try-out. Means are also incorporated to compensate for wear of the torque transmitting material.

11 Claims, 2 Drawing Figures

AIR GAP ADJUSTER FOR ELECTRIC CLUTCHES

BACKGROUND OF THE INVENTION

1. Field of the Invention

The present invention relates in general to friction type clutches or brakes including electromagnetically operated disengaging means wherein an armature with a driving friction ring is moved into and out of engagement with the friction elements associated with the output means and specifically to adjusting the air gap between the armature and the magnetic pole faces.

2. Description of the Prior Art

In prior art clutches or brakes of this type, the disengagement of the clutching members is affected by a solenoid disposed in an axially stationary component (magnetic core) of the clutch or the brake. The magnetic field generated by the solenoid, overcoming the force of the clutch or the brake springs, attracts the axially displaceable armature across an air gap and this removes the pressure exerted by the springs on the friction elements.

Several prior art devices are directed toward the problem of automatically adjusting the air gap to compensate for wear of flat friction elements (U.S. Pat. Nos. 3,458,022; 3,485,330; 3,613,849; and 3,857,468). In U.S. Pat. No. 4,030,583 to Miller, owned by the assignee of the present invention, an electric cone clutch is disclosed wherein the air gap is maintained in a fixed position and the relative position between the armature and the friction ring is maintained by a retarder disposed coaxially with the armature. None of the above prior art designs provides for an easy adjustment of the initial air gap so that it is responsive to a fixed level of electromagnetic flux generated in the magnetic coil. Furthermore, it is a disadvantage of the aforementioned prior art structures that production tolerances must be closely maintained to obtain the initial air gap setting within specific limits. It is a further disadvantage of the prior art clutches that when the voltage required to disengage the clutch exceeds enginerring specifications, the clutch must be disassembled and shims installed therein to reduce the air gap in order to permit the clutch to disengage within the specified voltage limitation.

SUMMARY OF THE INVENTION

The present invention provides a means for adjusting the air gap between the magnetic pole faces and the armature in an electromagnetic clutch for transmitting torque from an input means to an output means.

The input means includes a clutch adjusting means comprising an electromagnetic winding, a friction ring member, an armature, and an adjusting plate member coaxially disposed with the input means. The armature is threadedly connected to the friction ring member. The friction ring member is engaged to move axially with respect to the inner body member which is mounted to the input means. Means are provided for adjusting the armature with respect to an adjusting plate member so that a predetermined air gap is formed between the armature face and the pole faces on the inner body.

When the clutch is deenergized, biasing means moves the friction ring member against the output means thus transmitting torque from the friction ring member to the output means. When the electromagnetic winding is energized, a flux path is set up between the pole faces of the inner body member and the armature which is located adjacent to the inner body member. In the energized state, the armature overcomes the biasing means to pull the friction ring member away from the output means, thereby stopping the transmittal of torque from the input means to the output means. The friction device maintains this disengaged position until the electromagnetic winding is again de-energized.

It is a primary object of this invention to provide a fail safe electromagnetic clutch with means for adjusting the position of the armature face with respect to the pole faces of the inner body prior to attaching the electromagnetic coil housing to the clutch assembly.

It is a further object of the invention to provide a unique and simplified electromagnetic fail safe clutch with gap adjusting means to permit the electromagnetic coil to disengage the clutch with a predetermined voltage without disassembling the clutch thus permitting the loosening of production part tolerances previously maintained to achieve an air gap within specific limits.

It is another object of this invention to provide a fail safe electromagnetic clutch with a simplified adjustable armature which utilizes an inexpensive method of connecting the armature to an adjuster plate member and yet permits the easy adjustment of the air gap between the armature and the inner body member to match the magnetic flux generated by a predetermined voltage on the coil.

DESCRIPTION OF THE PREFERRED EMBODIMENT

Figure 1:
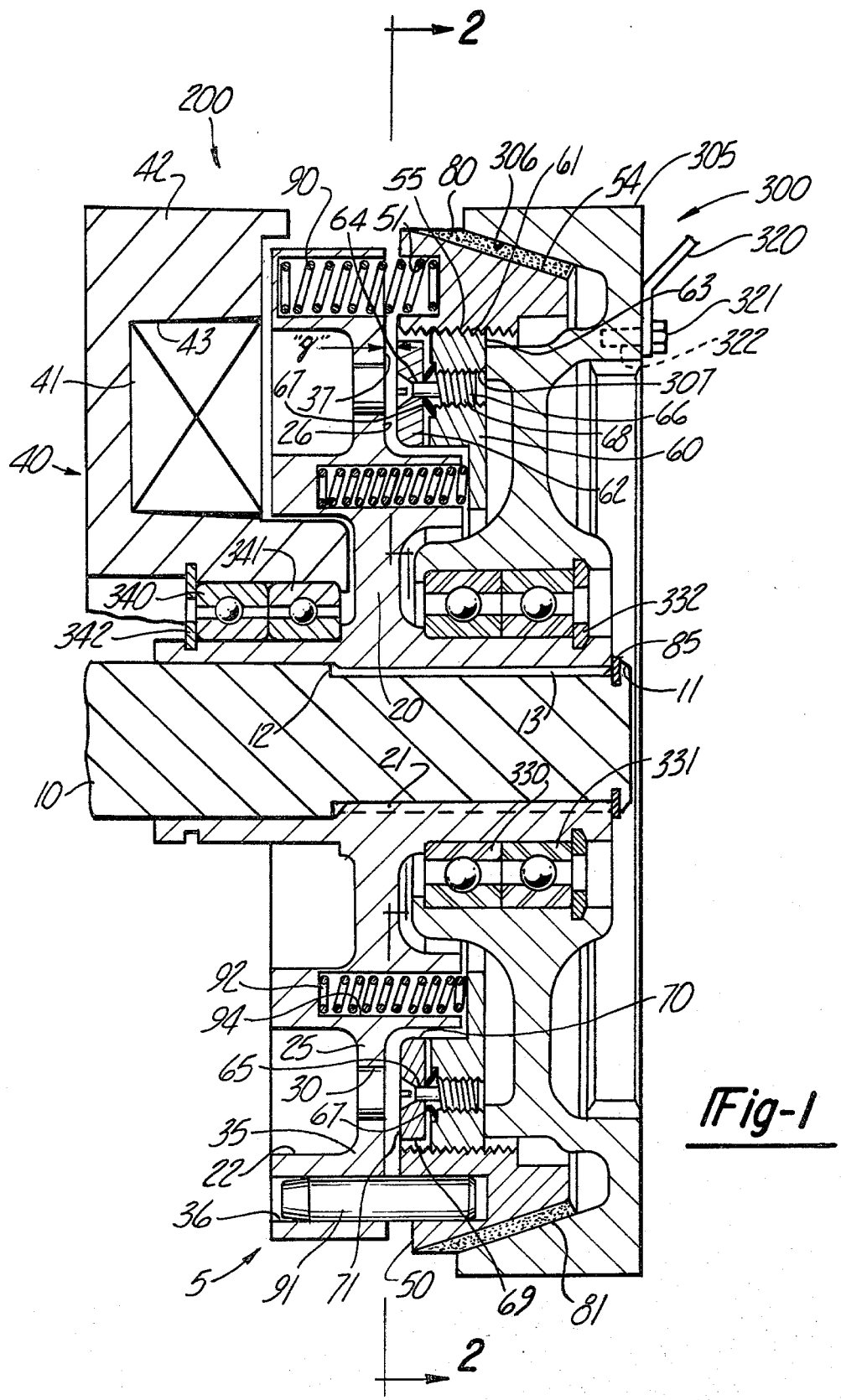
FIG. 1 is a partial sectional view of the preferred embodiment of the invention showing the clutch elements in the engaged position.

Referring to FIG. 1, there is shown a fail safe electromagnetic friction device 5 according to the invention. The friction device 5 is adapted to transmit torque from an input means 200 to an output means 300 thereby driving the output means and any element attached thereto such as a cooling fan 320. The output means 300 consists of an output friction member 305 which is adapted to provide a means for securing the output element 320 thereto. Here, the output element is shown as the fan blade and the means for securing the output element by a plurality of bolts 32 in threaded holes 322. It is also possible to provide a positive coupling to some other device which would utilize the rotative power transferred to the output means 300 by the input shaft 10 through the friction device.

The output friction member 305 has a frustoconical surface 306 and an armature adjusting surface 307. The output friction member 305 is mounted to bearing members 330 and 331 in any suitable manner. The bearing members 330 and 331 are mounted to the inner body member 20. The bearing members 330 and 331 are of free wheeling type and are held in position by a lock ring 332 or any other suitable means.

The electromagnetic friction device 5 also includes an input means 200 which is movable to provide frictional engagement with the output means 300. The input means 200 consists of an input shaft 10, an inner body member 20 mounted on the shaft 10, a driving friction cone member 50, an adjuster or adapter plate member 60 and an annular clutch armature 62, and clutch actuating means 40. The inner body member 20 is composed of three concentric annular elements 25, 30, and 35 respectively which form one integral rotatable body defining an annular cavity 22 coaxial with the input shaft 10. In order to establish two separate flux conducting surfaces or pole faces, the radially inner member portion 25 of the inner body member 20 is separated from the radially outer portion 35 of the inner body member by a series of apertures 30. This specific feature of electromagnetic clutches, that is, establishing two poles, is a well known principle in the art.

The apertures 30 may be manufactured by machining the inner body 20 to isolate the magnetic flux path from the inner body member 20 to the armature 62. Alternatively the radially inner member portion 25 of the inner body member 20 may be separated from the radially outer portion 35 of the inner body member by a non-conducting ring with a series of apertures 30 formed through the non-conducting ring. The non-conducting ring may be manufactured from various nonmagnetic materials, such as stainless steel, brass, etc. The radially inner portion 25 and the radially outer portion 35 of the inner body member may be made from various magnetic materials, such as iron, steel, etc. The annular inner body member 20 is mounted to the input shaft 10 in any conventional way, such as the splines 13 shown, or any other convenient means for providing a positive means of transferring torque without any loss of efficiency from the input shaft 10 to the inner body member 20. The inner body member 20 is secured against axial movement by cooperation of the lock ring 85 mounted in a groove 11 in the input shaft 10. A shoulder portion 12 of the spline 12 on the input shaft provides a surface for the inner body member 20 to engage and establish an axial location with respect to the lock ring 85. The mating splines 21 of the input shaft 10 and the splines 13 of the inner body member 20 need not be of any definite form as long as suitable form is used whereby torque can be transmitted positively without any loss of efficiency from the input shaft to the inner body member. The relationship of the lock ring 85 and the shoulder locating surface 12 permits the inner body member 20 to maintain proper alignment with the input shaft 10 and also provides proper alignment with the electromagnetic coil 41. The radially outer member portion 35 of the inner body member 20 has a plurality of cavities 36 near its outer diameter.

The radially inner portion 25 of the inner body member 20 has a pole face 26 which is normal to the input shaft axis and parallel to and adjacent the armature 62. The radially outer member portion 35 of the inner body member 20 also has a pole face 37 disposed normal to the clutch axis and parallel to and adjacent to the armature 62. The radially outer member portion 35, the radially inner portion 25, and the apertures 30 constitute the integral inner body member 20 which is positioned with respect to the clutch actuating means 40 to provide a continuous flux path upon energizing the electromagnetic winding. The radially inner portion 25 further has a plurality of cavities 94.

The clutch actuating means 40 comprises an electromagnetic winding or coil 41 and a flux conductive housing 42 for the electromagnetic winding 41. The electromagnetic winding, or coil 41, is disposed within a cavity 43 of the housing 42 and is contained therein by any suitable adhesive, such as epoxy. The coil 41 may be manufactured from copper wiring or other suitable material and is suitably connected to a power source and electrical control means (not shown). The housing 42 is nonrotatably mounted with respect to the inner body member 20 through means of bearing members 340 and 341 in any suitable manner. The bearing members 340 and 431 are mounted to the inner body member 20. The bearing members 340 and 341 are of free wheeling type and are held in position by a locking ring 342 or other suitable means in a groove in the inner body member 20. The positioning of the clutch actuating means 40 and the annular cavity 22 as provided in the integral inner body member 20 results in a continuous flux path being formed upon energizing of the coil 41. The flux path is set up from the coil to the radially outer portion pole face 37, to the armature 62, to the radially inner portion pole face 26 and returning to the electromagnetic winding or coil 41.

Figure 2:
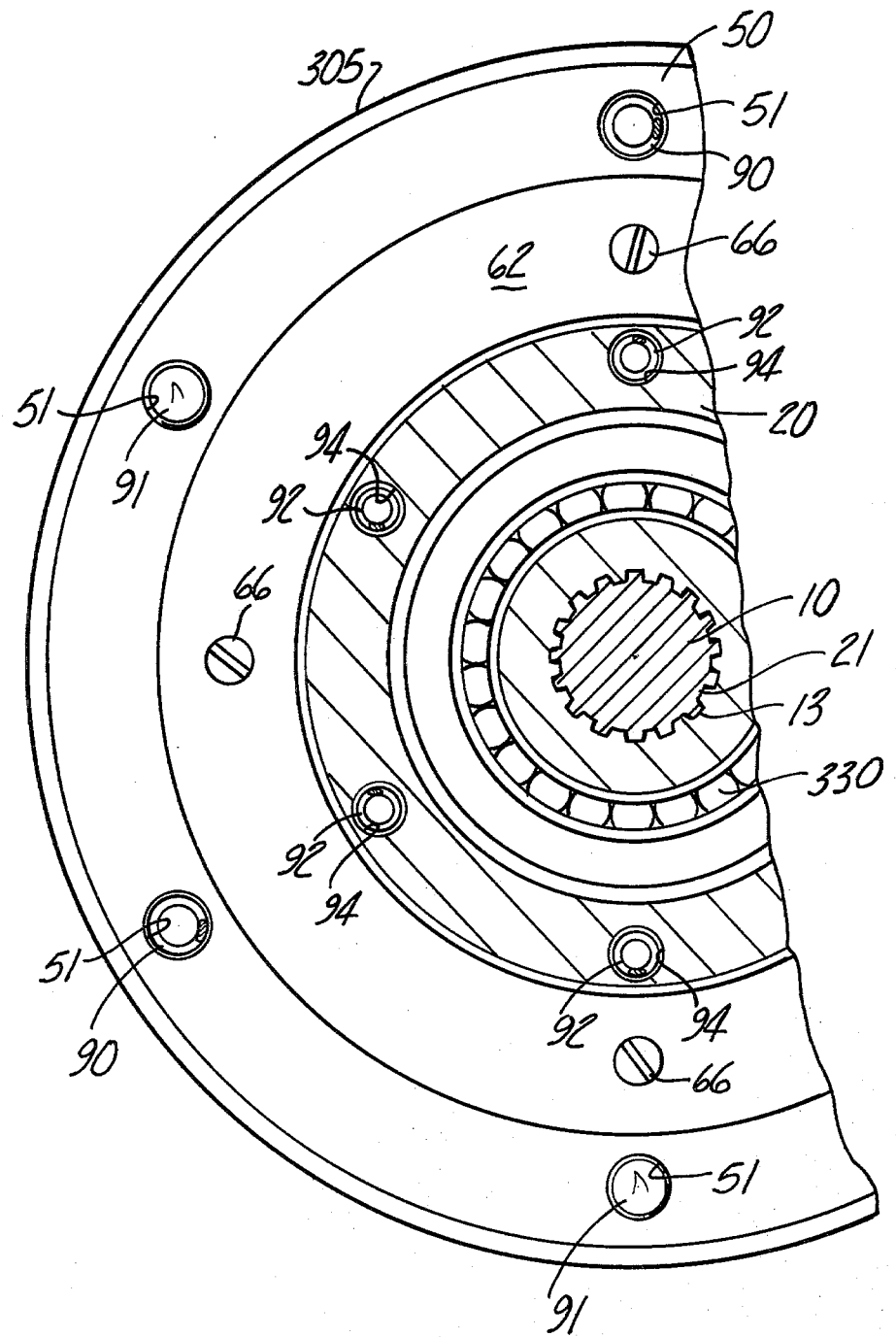
FIG. 2 is a fragmentary sectional view taken along section 2—2 in FIG. 1 showing the interrelation of the armature friction cone ring member and the inner body member.

The principle torque transmitting member is an annular frusto-conical friction ring or cone member 50. The friction ring member 50 further has a plurality of cavities 51 near its outer diameter. The plurality of cavities 51 are adapted to alternatively receive pins 91 or biasing members 90, such as compression springs as shown in FIG. 2. The pins 91 serve to radially align the friction ring member 50 with respect to the inner body member 20. The biasing members 90 permit the friction ring member 50 to move axially with respect to the inner body member 20 when the clutch is deenergized. Thus, as shown in FIG. 1, the friction ring member 50 is permitted to move axially with respect to the inner body member 20 but it is nonrotatably mounted with respect to the inner body member 20 by action of the pins 91. The friction ring member 50 has an outer surface 54 which is frusto-conical in cross section. Onto the frusto-conical outer surface 54 is mounted a friction material 80 using any suitable adhesive or mechanical bond. The friction material 80 has a friction engaging surface 81 to frictionally engage with a mutually engagable frusto-conical surface 306 of the output friction member 305 of the output means 300. The cylindrical inner surface of the friction ring or cone member 50 is threaded 55 therealong. Since the friction ring member 50 is not in the flux path of the electromagnetic clutch, the cone member may be fabricated from a wide selection of magnetically or nonconductive materials or a friction material can be attached to the friction ring member as for example by a mechanical adhesive bond. The friction material in the preferred embodiment is organic material; thus, clutch torque, clutch life and operational noise are optimized.

The biasing members 90 are interposed directly between the inner body member 20 and the friction ring member 50. The biasing members 92 are inserted in cavity 94 to act between the inner body member 20 and the adjuster plate member 60. In the preferred embodiment three compression springs 90 are mounted between the adjuster plate member 60 and the inner body member 20 and three pins 91 alternating positioned with compression springs 90. Any combination of pins alternating with compression springs may be used, i.e. four compression and two pins or two compression springs and four pins. The number of pins and springs is also not limited to six as shown in the preferred embodiment. The biasing members 90, 92 are mounted to act directly and indirectly upon the friction ring member 50 and move the friction ring member 50 into engagement with the output means 200 when the electromagnetic winding 41 is de-energized. The biasing members 90, 92 exert a force upon the friction ring member and the adjuster plate member 60 in the energized condition in a direction to move the members 50, 60 away from the pole faces 26, 37. Thus, when the electromagnetic winding is de-energized, the spring forces of the biasing members move the friction ring member and the adjuster plate member as well as the armature in an axial direction away from the pole faces 26, 37. This movement causes the friction surface 80 on the friction ring 50 to engage the frusto-conical surface 306 of the output friction member 305 thereby transmitting torque to the output means. Upon de-energizing the electromagnetic coil, or in other words, with a loss of electrical power to the magnetic winding whether through a power failure or manual control of the electrical power, the clutching surfaces are moved into engagement under the influence of the biasing forces and remain in engagement until electrical power is again restored or until electrical power is again allowed to energize the electromagnetic winding.

It should be noted that the armature 62 is fabricated from a conductive material such as steel, iron, etc. so that the armature is responsive to the magnetic flux eminating from the pole faces 26, 37 when the electromagnetic coil is energized. On the other hand, the adapter plate member 60 is preferably fabricated from a nonconductive material so as to avoid leakage of magnetic flux through it, when the electromagnetic coil is energized. Forming a magnetic flux path through the adapter plate member is to be avoided because it could interfere with the responsiveness of the armature 62 to the magnetic flux eminating from the pole faces 26, 37 when the electromagnetic coil is energized.

The annular armature 62 and the adjuster plate 60 are mounted between the output friction member 305 and the inner body member 20. The adjuster plate member 60 has a radially outer threaded surface 61 threaded along its entire length. The thread 61 cooperates with the thread 55 on the friction ring member 50. The adjuster plate member 60 further terminates in an end face which is an axial adjusting surface 63 which abuts against the surface 307 of the output friction ring member 305 to stop the axial movement of the member 60 when the armature is electromagnetically de-energized.

As stated above, when the electromagnetic force is removed, the force generated by the biasing members 90, 92 acts in an axial direction to move the friction ring member 50 into engagement with the output means 300. This same axial force disengages the armature 62 from the pole faces 37, 26 and causes the surface 63 of the adjuster plate member 60 to come into contact with the output friction member adjusting surface 307. The adjusting failure of the electromagnetic clutch device is obtained through the interaction of the output friction member adjusting surface 307 and the adjuster plate member adjusting surface 63. As the friction ring member and the adjuster plate member move toward the output friction member 305, the rotational velocity of the armature and the adjuster plate member is decreased at the plate adjusting surface 63 by the static condition of the surface 307 of the output means. The friction ring member, which continues to rotate at the input shaft speed through the inner body member splines 13 mating with the splines 21 on the input shaft 10 is caused to move axially forward in a direction towards the output means along the mutually engagable threads 55, 61 between the friction ring member and the adjuster plate member due to a small difference in rotational speed between the adjuster plate member and the friction ring member. The friction ring member continues to advance until the friction engaging surface 81 of the driving friction ring member and the friction engaging surface 306 of the output friction member come into engagement. Simultaneously, as the adjuster plate member threads itself along the friction ring member, torque is transferred from the friction ring member, to the output means through the mating frictional surfaces of the respective members.

The adjuster plate member is allowed to thread itself with respect to the friction ring member in one direction only. As wear occurs on the friction material, the adjuster plate member threads itself along the inner diameter of the friction cone. It will be noted that the adjuster plate member will thread itself completely along the friction ring member and thereby use the full extent of the friction material thickness mounted to the friction cone without any adverse effect upon the torque output of the friction device or without adverse wear to the armature pole faces of the inner body member.

On the other side of the adjuster plate member 60, that is, the face opposite the adjusting surface 63, there are a plurality of threaded holes 68 axially in line and radially positioned with respect to the apertures 30 on the inner body member 20.

The outermost diameter 69 of the armature 62 is smaller than the thread 55 of the friction ring member 50 to provide radial clearance with respect to the friction ring member and to allow the armature 62 independent movement with respect to the friction ring member. The innermost diameter 70 of the armature 62 terminates radially such as to permit the clearance of the armature 62 with respect to the inner body member 20 so as to allow independent movement thereof. The face of the armature 62 is drilled with a plurality of holes 65 axially in line and radially positioned with respect to the apertures 30 on the inner body member 20 and to the threaded holes 68 on the adjuster plate member 60.

Flat head adjusting fasteners 66 are inserted through the holes 65 and threaded into adjuster plate screw threaded holes 68. Interposed the adjuster plate member 60 and the armature 62 is spring means 67 which is fitted over the diameter 64 of the adjusting fastener 66. The fastener 66 is then engaged to the threaded 68 in the armature plate member 60. In the preferred embodiment, a high strength fastener and thread locking adhesive which is well known in the art is used to prevent the fastener 66 from disengaging the threads 68 in the adjuster plate member 60.

As stated previously, when the electromagnetic force is removed, the force of the biasing members 90, 92 act in the axial direction to force the armature 60 and adjuster plate member 62 and hence the friction ring member 50 to engage the output means 300. This causes an air gap "g" between the face 71 of the armature 62 and the pole faces 26, 37 on the inner body member 20. The air gap "g" can be adjusted so that the voltage to disengage the clutch does not exceed previously selected voltage requirements by advancing the fastener 66 into or out of further engagement with the threaded hole 68 on the adapter plate member 60. It should be noted that the spring means 67 on the fastener 66 is interposed the armature 60 and adjuster plate member 62 thus separating the two members so as to permit the axial movement of the adjuster plate member with respect to the armature. Thus, when the fastener 66 is either advanced or retracted, the air gap "g" is made smaller or bigger so that the armature is responsive to a predetermined electromagnetic coil voltage.

FIG. 2 illustrates the inter-relationship of the friction ring member 50, the inner body 20 and the output shaft 10. The biasing means 90 and the pins 91 are radially disposed so as to allow axial movement of the friction ring member 50 with respect to the inner body member 20 while the friction ring member 50 is prevented from relative rotation with the inner body member 20 by virtue of the pins 91. The spline coupling 13, 21 respectively, shown at the input shaft to inner body mounting is only shown for illustrative purposes and is not intended to be limiting. Any convenient mutually engagable coupling preventing rotatable movement may be used.

As shown in FIG. 1, during assembly of the clutch, and with the electromagnetic winding de-energized, the compression springs 90 between the inner body and the friction ring member 50 and the compression springs 92 between the inner body 20 and the adjuster plate 62 cause the friction ring member 50 to move axially toward the output means 300 until stopped by the friction engaging surface 307. This axial movement causes an air gap "g" to form between the pole faces 26, 37 of the inner body member 20 and the face 71 of the armature 62. When the electromagnetic winding is energized by a predetermined voltage, the winding emits magnetic engaging forces through the pole faces 26, 37. These magnetic forces exert axial forces which act through the inner body member 20 to attract the armature 62 and, thereby provide surface to surface contact between the pole faces 37, 26 and the face 71 of the armature 62. During this energized condition, the armatures 62 and adjuster plate 60 as well as the friction ring member 50 are under the influence of compression springs 90, 92 which generate a force acting in an axial direction opposite to the magnetic forces from the inner body member 20 and towards the output means 300. In addition to overcoming these compressive spring forces, the magnetic engaging forces must also overcome the loss in magnetic energy force caused by the air gap "g". By adjusting the fastener 66 to move the armature 62 away from the adjustor plate member 66 or toward pole faces 26, 37, the air gap "g" between the face 71 of the armature 62 and the pole faces 27, 35 decreases, thereby reducing the loss of magnetic engaging force. When the magnetic engaging force is increased by reducing the air gap "g", the compressive spring forces are overcome, thus, the friction ring member 50 and the armature 62 and adjuster plate member 60 move axially towards the inner body member 20 to disengage from the output means 300.

OPERATION

When the electromagnetic winding is energized, the face 71 of the armature 62 is moved axially into engagement with the pole faces 26, 37 of the inner body member 20. The magnetic engaging force exerted on the armature 62 is completely axial and, therefore, provides a close contact between the pole faces and the face of the armature. Under this energized condition, friction engaging surface 81 of the driving friction ring member 50 disengages from the mating surface 306 of the output means 300 and overcomes the spring forces of the biasing means 90, 92 to permit the friction ring member 50 to move axially toward the inner body member 20.

In this energized state, the inner body member 20, the adapter plate member 60, the armature 62, and the friction ring member 50 will continue to rotate at the speed of the input shaft 10. The output means 300 may come to a standstill after energizing the electromagnetic winding.

Upon losing power in the electromagnetic circuit, the compression spring forces of the biasing means 90, 92 between the inner body member 20 and the friction ring member 50 and the inner body member 20 and the armature 62 cause the friction ring member 50 to axially toward the output means 300. As the friction ring member 50, the adapter plate member 60, and the armature 62 move toward the output means 300, the rotational velocity of the adapter plate member 60 and the armature 62 is decreased when the member 60 contacts adapter plate member adjusting surface 63 by the static condition of the output means 300. The friction ring member 50 continues to rotate at the input shaft speed because of the pins 91. Furthermore, the friction ring member is caused to move axially forward along the mutually engagable thread 55, 61 between the friction ring member 50 and the adapter plate member 60 toward the output means 300 due to the small difference of speed between the adapter plate member 60 and the armature 62 and the friction ring member 50. This causes the friction surface 81 on the driving friction ring member 50 to advance into engagement with the mating surface 306 of the output means 300. Simultaneously, as the adapter plate member 60 threads itself along the friction ring member 50, almost all of the torque is transferred from the friction ring member 50 to the output means 300 to the mating friction surface 81, 306 of the respective members. The adjustment between the adapter plate member 60 and friction ring member 50 will continue until maximum torque is transmitted to the mutual frictional surfaces. This initial adjustment only occurs the first time that the clutching surface is engaged or when wear occurs thereafter. From this time forward, no additional adjustment occurs between the adapter plate member 60 and the friction ring member 50 unless wear is exhibited at the mutual friction surfaces. Upon wearing of these surfaces, the adapter plate member 60 will again, when becoming de-energized adjust itself with respect to the friction ring member 50 and the adapter plate member adjusting surface 63 of the output means until such time that maximum torque can be transmitted through the clutching device. The adapter plate member 60 and the friction ring member 50 remain in exactly the same position with respect to each other as in the prior de-energized position.

When the electromagnetic winding is again energized, the adapter plate member 60, the armature 62 and the driving friction ring member 50 are axially withdrawn from the output means under the influence of the electromagnetic force applied by the electromagnetic coil. Upon becoming disengaged from the output means, the adapter plate member 60, the armature 62 and the friction cone member 50 rotate at the same speed as the input shaft 10. When the electromagnet is again de-energized, the adapter plate member 60, the armature 62 and the friction ring member 50 will move toward the output means and the frictional surfaces respectively and the same basic relative position between the frictional surface on the output member and the friction material surface of the cone member is reestablished.

As wear occurs, the same basic cycle as described above is repeated and continues to occur until all the friction material wears away. Movement between the adapter plate member 60 and the driving friction ring member 50 is immediate and it automatically adjusts the position of the friction ring member to compensate for any wear that occurs at the frictional surfaces. In addition, it should be noted that as wear occurs, there is no change in the air gap "g" between the armature and the inner body member.

While a preferred embodiment of the invention has been disclosed, it will be apparent to those skilled in the art that changes may be made to the invention as set forth in the appended claims and in some instances certain features of the invention may be used to advantage without corresponding use of other features. For example, the clutching surface can easily be used as a breaking device with little or no change in the basic concepts of the invention disclosed or the clutching device can be a flat disc rather than a cone shape as shown in the preferred embodiment. Accordingly, it is intended that the illustrated and descriptive materials herein be used to illustrate the principles of the invention and not to limit the scope thereof.

What is claimed is:

1. An electromagnetic device for transmitting torque comprising:
   input means;
   output means coaxially disposed with said input means;
   means for transferring torque from said input means to said output means, said torque transferring means further comprising:
      an adjustable friction ring member disposed adjacent to said output means and interposed said input and output means;
      an inner body member interposed said friction ring and said input means, said inner body member coaxially disposed with said friction ring member;
      means for attaching said inner body member to said friction ring member for rotational movement therewith; and
      biasing means, interposed said friction ring member and said inner body member, for engaging said friction ring member to said output means;
   means for electromagnetically actuating said torque transferring means, said actuating means disposed with respect to said inner body member to form a circuitous flux path therewith, said actuating means further comprising:
      a magnetic armature member concentrically disposed with said friction ring member;
      an adjuster plate member concentrically disposed with said friction ring member and mounted for rotation with said magnetic armature member;
      means for mounting said adjuster plate member to said friction ring member;
      means for moving said adjuster plate member and said armature with respect to said inner body member when said electromagnetic means is engaged so that a circuitous flux path is formed between said armature and said inner body thereby causing the friction ring to disengage the output means; and
      means for axially adjusting said armature relative to said inner body member whereby said armature is axially adjusted free of requiring complete disassembly of said device, said adjusting means forming a predetermined axial air gap between said armature and said inner body member so that when said electromagnetic means is de-energized, said biasing means causes said friction ring to engage said output means and so that when said electromagnetic means is energized by a predetermined voltage level applied to said electromagnetically actuating means, said friction ring is caused to disengage said output means.

2. An electromagnetic device, as recited in claim 1, wherein said input means comprises a power driven shaft.

3. An electromagnetic device, as recited in claim 2, wherein said means for biasing said friction ring member includes:
   first compressive spring mounted between said inner body member and said adjusting plate member.

4. An electromagnetic device as recited in claim 3 wherein said means for biasing said friction ring member further includes:
   second compressive spring mounted between said inner body member and said friction ring member.

5. An electromagnetic device, as recited in claim 4, wherein said means for mounting said adjuster plate member to said friction ring member comprises a helical thread on the inside diameter of said friction ring member.

6. An electromagnetic device, as recited in claim 4 further comprising:
   means for adjusting said adjuster plate member with respect to said friction ring member, said means enabling axial and rotational movement of said friction ring member with respect to said adjuster plate member.

7. An electromagnetic device for transmitting torque comprising:
   an input shaft;
   an output means coaxially disposed with said input shaft and free to rotate thereon, said output means adapted to transmit torque;
   an inner body member coaxially disposed with said input shaft for rotation therewith, said inner body member having an inside diameter adapted to mount to said input shaft, an outside diameter and a plurality of pole faces between said inside and said outside diameters;
   a friction ring member coaxially disposed with said inner body, said friction ring having means for engaging said inner body, said friction ring further having means for frictional engagement with said output means and said friction ring further having an inner helical threaded surface;
   clutch actuating means mounted adjacent to said output means, said actuating means further comprising:
      an electromagnetic winding;
      an armature member coaxially disposed with said input shaft, said armature member further mounted opposite said pole faces, said armature further being axially moveable toward and away from said pole faces in response to said clutch actuating means;
      an adjuster plate member coaxially disposed with said friction ring member, said adjuster plate member further having an outer helical threaded thread surface for engaging said inner helical threaded surface of said friction ring;

means for biasing said friction ring member into engagement with said output means when said electromagnetic winding is deenergized;

means for axially adjusting said adjuster plate member with respect to said armature to form a predetermined axial air gap between said armature and said pole faces on said inner body member free of requiring the complete disassembly of said device to form said air gap when said electromagnetic winding is de-energized and such that said armature moves axially toward said inner body in response to said electromagnetic winding when energized by a predetermined winding voltage applied to said electromagnetic winding; and means for moving said armature member into axial engagement with said pole faces when said electromagnetic winding is energized so that a circuitous flux path is formed between said armature and said inner body thereby causing said friction ring to move axially away from said output means.

8. An electromagnetic device, as recited in claim 7 further comprising:

means for adjusting said adjuster plate member with respect to said friction ring member, said adjusting means enabling axial and rotational movement of said friction ring member with respect to said adjuster plate member.

9. An electromagnetic device as claimed in claims 1 or 7 further comprising:

means, interposed said armature member and said adjuster plate member, for biasing said armature member away from said adjuster plate member.

10. In combination with an electromagnetic clutch of the type wherein torque is transmitted from input means to output means upon de-energizing of electromagnetic coil means and wherein an inner body member with magnetic pole faces is disposed with said input shaft for rotation therewith, the improvement comprising:

an annular friction ring member having means for engaging said output means and further having an inner helical threaded surface;

means for biasing said friction ring member in a direction away from said pole faces on said inner body member when said electromagnetic means is energized to a predetermined voltage level and for engaging said friction ring member to said output means upon de-energizing of said electromagnetic coil means;

an armature member concentrically disposed with said friction ring member;

an adjuster plate member concentrically disposed with said friction ring member, said adjuster plate member having an outer helical thread surface for engaging said inner helical threaded surface on said friction ring;

means for moving said adjuster plate member with respect to said armature member so that a predetermined axial air gap is formed between said armature and said pole faces on said inner body member when said electromagnetic winding is de-energized; and means for axially adjusting said adjuster plate member with respect to said friction ring member, said adjusting means enabling axial and rotational movement of said friction ring member with respect to said adjuster plate member, whereby said predetermined voltage is required to energize the electromagnetic coil means to disengage said frictional ring member from said output means to overcome said biasing means and to overcome the predetermined axial air gap formed between said armature and the inner body member, the inner body member having portions defining radial openings aligned with said moving means, said radial openings permitting adjustment of said adjusting means through said radial openings such that said axial air gap is adjusted free of requiring complete disassembly of said device.

11. In the combination as claimed in claim 10, further comprising:

means, interposed said armature member and said adjuster plate member, for urging separation of said armature member away from said adjuster plate member.

* * * * *

UNITED STATES PATENT AND TRADEMARK OFFICE
CERTIFICATE OF CORRECTION

PATENT NO. : 4,285,420

DATED : August 25, 1981

INVENTOR(S) : Thomas C. Sekella

It is certified that error appears in the above—identified patent and that said Letters Patent is hereby corrected as shown below:

Column 1, line 41, delete "enginerring" and insert ----engineering----.

Column 2, line 51, delete "32" and insert ----321----.

Column 3, line 35, second occurrence, delete "12" and insert ----21----.

Column 4, line 7, delete "431" and insert ----341----.

Column 5, line 54, delete "failure" and insert ----feature----.

Column 6, line 47, delete "threaded" and insert ----thread----.

Column 7, line 13, after the words "shaft to" insert ----connect the----.

Column 7, line 13, delete "mounting" and insert ----member----.

UNITED STATES PATENT AND TRADEMARK OFFICE
CERTIFICATE OF CORRECTION

PATENT NO. : 4,285,420
DATED : August 25, 1981
INVENTOR(S) : Thomas C. Sekella

It is certified that error appears in the above—identified patent and that said Letters Patent is hereby corrected as shown below:

Column 7, line 62, delete "close" and insert ----closed----.

Column 8, line 11, after the word "to" insert ----move----.

Signed and Sealed this

Twenty-seventh Day of October 1981

[SEAL]

Attest:

GERALD J. MOSSINGHOFF

Attesting Officer

Commissioner of Patents and Trademarks